Patented Aug. 5, 1952

2,606,187

UNITED STATES PATENT OFFICE 2,606,187

N-GLYCOSIDO BENZIMIDAZOLES AND PROCESS FOR PREPARATION

Dorothea Heyl Hoffman, Rahway, N. J., assignor to Merck & Co., Inc., Rahway, N. J., a corporation of New Jersey No Drawing. Application August 2, 1950, Serial No. 177,336

14 Claims. (Cl. 260—211.5)

1

This invention relates to an improved process for preparing benzimidazole, and more particularly to a method of obtaining the α-isomers of glycosidobenzimidazoles.

Certain of the α-glycosidobenzimidazoles are important since they have been found to promote the growth of animals when incorporated in the animal diet. For example, 1-α-ribofuranosido-5,6-dimethylbenzimidazole, hereinafter also called α-ribazole, promotes the growth of certain animals when incorporated in the diet. Therefore, this substance is valuable for incorporation in foodstuffs as a source of the necessary growth-promoting factor.

The synthesis of α-glycosidobenzimidazoles has previously been accomplished by imino-ether ring closure of the appropriate N-glycosido derivative which is described in the copending application, Serial No. 124,236, filed October 28, 1949. It has also been prepared by the reaction of a silver salt of 5,6-dimethylbenzimidazole and the appropriate haloacetosugar derivative. However, both of these processes possess an inherent disadvantage in that they result in the formation of significant amounts of the β-isomer, which is difficult to separate from the desired α-isomer. Accordingly, a process which would yield essentially only the α-isomer in good yields is extremely desirable.

This invention is concerned with a method of preparing 1-glycosidobenzimidazoles. It is one object of the present invention to provide an improved process for obtaining these glycosidobenzimidazoles. It is a further object to provide a method whereby these α-glycosidobenzimidazoles can be readily prepared. Other objects will be apparent from the detailed description of the invention hereinafter provided.

According to the present invention it is now found that 1-glycosidobenzimidazoles are conveniently prepared by reacting the corresponding N-glycosido-1,2-phenylenediamines with carbon disulfide and barium hydroxide to produce the intermediate product, 1-glycosido-2-mercaptobenzimidazole, and, intimately contacting this mercapto intermediate with Raney nickel to obtain the corresponding benzimidazole. The term "glycosido" as employed herein will be understood to include both unsubstituted glycosido compounds as well as glycosido compounds substituted with groups that are readily removed by hydrolysis to obtain the free glycosido compound. Thus, in some cases we prefer to use a glycosido derivative having a hydrolysable group such as the trityl group on the primary hydroxy group.

2

Alternatively, the glycosido compound may be acylated, or substituted with acyl groups and a trityl group, which can be readily removed by hydrolysis. These variations of my process will be readily apparent to those skilled in the art.

The reactions involved in the process of my invention may be illustrated as follows:

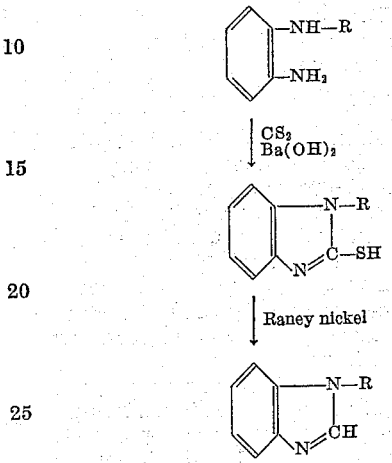

wherein R represents a glycosido group, or a substituted glycosido group containing hydrolysable groups. Further, the benzene ring may be substituted by other groups such as alkyl, and the like.

The first step of my process is conveniently effected by intimately contacting the N-glycosidophenylenediamine with carbon disulfide and barium hydroxide and permitting the reaction to continue to completion. The time required for completion of the reaction will vary depending upon the starting material used and the temperature, but generally I find a minimum of about six hours is required. Sometimes I find it desirable to allow the mixture to react for 48 hours in order to obtain maximum yields. The temperature for carrying out the reaction may be varied depending upon the particular compound being treated. In general, I find that temperatures ranging from about 15 to 50° C. are satisfactory and that a maximum yield is obtained at about 25° C. under optimum conditions. I find that it is preferable to carry out the reaction in an inert solvent medium such as benzene, toluene, xylene, and the like.

The intermediate mercaptobenzimidazole is recovered from the reaction mixture by conventional chemical operations. In most cases, I find that it is conveniently recovered by removing the volatile constituents of the reaction mixture under reduced pressure, adding water to the resulting residue, acidifying the solution so obtained with an inorganic acid such as sulfuric acid, and extracting the mercapto compound with a suitable immiscible solvent as, for example chloroform. The desired intermediate is then recovered by evaporating the solvent solution to dryness.

The second step of my process is effected by dissolving the mercaptobenzimidazole compound in a suitable solvent such as butyl alcohol, adding Raney nickel thereto, and refluxing the resulting mixture. After completion of the reaction, the suspended catalyst is removed by filtration and the benzimidazole recovered by evaporating the solvent.

When a compound having a substituted glycosido group is utilized as the starting material, the corresponding substituted benzimidazole is obtained by my process. If desired, the free glycosido compound is readily obtained by acid hydrolysis. For example, such compounds are readily hydrolyzed by refluxing the substituted glycosidobenzimidazole with an aqueous-alcoholic solution of hydrochloric acid.

In accordance with a further embodiment of this invention, I have found that this present method of effecting ring closure is particularly valuable for the preparation of N-glycosido-5,6-dimethylbenzimidazoles. As indicated previously, this improved procedure is a valuable method for obtaining the α-isomeric form of 1-D-ribofuranosido-5,6-dimethylbenzimidazole. Thus, contrary to the prior art processes wherein both the α- and β-forms are obtained, only the α-isomer is obtained by the method of the present invention. It is indeed surprising and unexpected to find that the process of the present invention produces essentially only the α-form and not the mixture of the α-β-isomers. The present invention is therefore particularly valuable in that it provides a means of preparing α-ribazole which is of nutritional importance.

In preparing α-ribazole by my new process we utilize the glycosido compound of the formula:

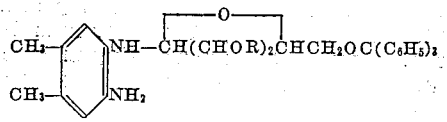

wherein R is hydrogen or acyl, as the starting material. This compound, 2-amino-4,5-dimethyl-5'-trityl-D-ribofuranosidoaniline is obtained by the condensation of 5-trityl-D-ribose and 2-nitro-4,5-dimethyl-aniline, and the subsequent hydrogenation of the 2-nitro-4,5-dimethyl-N-(5'-trityl-D-ribofuranosido)aniline so obtained. This process is described in the copending application of Holly, Shunk, Cahill and Folkers, Serial No. 124,236, filed October 28, 1949. If desired, the corresponding acyl derivative is readily obtained by treating this product with an acyl anhydride such as acetic anhydride, propionic anhydride, and the like.

In accordance with my present process, this compound, or the acylated derivative thereof, is converted to the corresponding mercaptobenzimidazole compounds by treatment with carbon disulfide and barium hydroxide. The mercapto compound is then reacted with Raney nickel to produce the corresponding glycosidobenzimidazole which on treatment with an aqueous-alcoholic solution of hydrochloric acid results in the hydrolysis of the trityl and acyl substituents of the glycosido group.

Similarly, the valuable compound, 1-L-arabinosido-5,6-dimethylbenzimidazole is obtained utilizing 2-nitro-4,5-dimethyl-2',3',4'-triacetyl-L-arabinopyranosidoaniline as the starting material.

The following examples are presented to illustrate specific embodiments of my invention.

Example 1

Twelve parts of 5-trityl-D-ribose prepared by the method of Bredereck, Kothnig and Berger, described in Berichte 73, 960 (1940), and 7.8 parts of 2-nitro-4,5-dimethylaniline prepared in accordance with the method of Noelting, Braun and Thermar, Berichte 34, 2242 (1901) were dissolved in about 200 parts of benzene which had been dried by distillation. To this mixture was added 1 part of glacial acetic acid. The mixture was then refluxed for 2 hours, and the water that was formed in the reaction was taken off continuously. The solution was cooled in an ice bath. A crystalline product was separated by filtration. The filtrate was concentrated in vacuo. The residue was treated with ethanol (2BA) and allowed to stand in the cold room overnight and more crystalline material separated and was filtered off. The filtrate was concentrated in vacuo to dryness. It was dissolved in a small volume of benzene and was chromatographed over 400 parts of acid-washed alumina. The column was eluted with benzene, then with ethanol giving 2-nitro-4,5-dimethyl-5'-trityl-D-ribofuranosidoaniline as a glass.

The 2-nitro-4,5-dimethyl-5'-trityl-D-ribofuranosidoaniline fraction eluted with ethanol was dissolved in about 100 parts of pyridine and the solution was cooled to 0° C. Fifty parts of acetic anhydride were then added to the cold solution. It was then placed in the cold room overnight. The next day the solution was cooled to 0° C. in an ice-salt bath and then 75 parts of ethanol were added. The solution was concentrated in vacuo to dryness. The residue was dissolved in ethanol and allowed to stand in a cold room for five days. A mixture of oil and crystals separated. This mixture was taken up in ethanol and concentrated in vacuo again. The residue was taken up in benzene-petroleum ether solution (1–1) and chromatographed over 250 parts of alumina. Elution with benzene-petroleum ether (1–1) gave 2-nitro-4,5-dimethyl-2',3'-diacetyl-5'-trityl-D-ribofuranosidoaniline as a glass.

Five grams of 2-nitro-4,5-dimethyl-2',3'-diacetyl-5'-trityl-D-ribofuranosidoaniline (prepared as described hereinabove and in Serial No. 124,236, filed October 28, 1949) dissolved in 100 cc. of benzene was reduced to 2-amino-4,5-dimethyl-2',3'-diacetyl-5'-trityl-D-ribofuranosidoaniline by shaking with 1.5 g. of palladium-Darco catalyst under a pressure of 2–3 lbs. of hydrogen. After removal of the catalyst and solvent, the syrupy amine, dissolved in 50 cc. of dry benzene, was stirred for two days with 20 cc. of carbon disulfide and 2.52 g. of barium hydroxide. The residue, after removal of the volatile material, was partitioned between chloroform and dilute sulfuric acid. The sulfuric acid fraction was extracted three times with chloroform, and the combined chloroform extracts washed three times with water. The chloroform solution, having been dried over sodium sulfate, was concentrated to dryness and the residue, consisting of 2',3'-diacetal-5'-trityl-1-D-ribofuranosido-2-sulfhydryl-5,6-dimethylbenzimidazole, was dissolved in 200 cc. of butyl alcohol. The solution was refluxed for three hours with one tablespoonful of Raney nickel. The butyl alcohol was distilled under reduced pressure and the residue refluxed for two hours with a mixture of 15 cc. of ethyl alcohol and 40 cc. of .67 N hydrochloric acid. The resulting solution was concentrated to half its original volume, then extracted three times with chloroform. The aqueous solution, cooled in an ice bath and made alkaline with sodium hydroxide, was extracted four times with chloroform. The almost colorless aqueous layer was cooled, reacidified with hydrochloric acid, decolorized with a little Darco, and concentrated to remove the chloroform. Addition of aqueous picric acid brought down 0.43 g. of α-ribazole picrate.

The identity of the picrate so obtained was established by a comparison with an authentic sample of α-ribazole picrate. The melting points of the picrate prepared by this example, an authentic sample of α-ribazole, and a mixture of the two as determined simultaneously in capillaries were as follows: α-ribazole picrate prepared by process of example 200–202° C., authentic sample of α-ribazole picrate 206–207° C., mixture of two products 200–202° C. In addition, it was found that by periodate titration the α-ribazole picrate prepared in accordance with the above example consumed 0.99 mole of periodate per mole. The theory for a furanoside is one mole; for a pyranoside, two moles.

Regeneration of the free base, α-ribazole, yielded a product having a melting point of 181–184° C. A mixture of this product with a known sample of α-ribazole was found to melt at 183–188° C. while the known sample melted at 191–193° C. These melting points were determined simultaneously in capillaries.

*Example 2*

When the same experiment as described in Example 1 was carried out on the non-acetylated material, 2-nitro-4,5-dimethyl-5'-trityl-D-ribofuranosidoaniline (the reduction was carried out in methyl alcohol instead of benzene) α-ribazole picrate was recovered in the same manner as described in the preceding example.

*Example 3*

2-nitro-4,5-dimethyl-2',3',4'-triacetyl-L-arabinopyranosidoaniline (2.1 g.) (prepared starting with L-arabinose and 2-nitro-4,5-dimethylaniline and utilizing the same procedure as that employed for preparing 2-nitro-4,5-dimethyl-2',3'-diacetyl-5'-trityl-D-ribofuranosidoaniline as described in Example 1 hereinabove and in Serial No. 124,236, filed October 28, 1949) was reduced in benzene solution with a palladium-Darco catalyst. After removal of the benzene under reduced pressure, the syrupy 2-amino-4,5-dimethyl-2',3'-4'-triacetyl-L-arabinopyranosidoaniline was further dried by addition and distillation of more benzene. The residue, dissolved in 50 cc. of dry benzene was treated with 10 cc. of carbon disulfide and 1.58 g. of finely ground barium hydroxide, and stirred at room temperature for two and one half days. The mixture was concentrated to dryness under reduced pressure, 25 cc. of water added, the resulting mixture cooled in ice, and 6 N sulfuric acid added until the pH was 2. Hydrogen sulfide was removed by a current of air. The aqueous solution was extracted three times with chloroform, the suspended barium sulfate being removed by filtration. The combined chloroform extracts were washed with water, dried over sodium sulfate, filtered and concentrated to dryness under reduced pressure. The remaining oil, consisting of 2',3',4'-triacetyl-1-L-arabinopyranosido-2-sulfhydryl-5,6-dimethylbenzimidazole, was dissolved in 200 cc. of butyl alcohol and was refluxed with 9 g. of Raney nickel for three hours.

After removal of the nickel by filtration and the butyl alcohol by distillation under reduced pressure, the residue was refluxed with a mixture of 15 cc. of alcohol and 40 cc. of 0.67 N hydrochloric acid for two hours. The alcohol was removed and the resulting aqueous solution extracted several times with chloroform. The aqueous solution, cooled in ice, was made alkaline with 6 N NaOH. The resulting mixture was also extracted with chloroform, filtered, concentrated to about half the original volume, and treated with saturated aqueous picric acid. The picrate obtained had a M. P. of 209–210° and was identical with a previously prepared sample of 1-L-arabinosido-5,6-dimethylbenzimidazole. The yield was about 0.61 g.

Various changes and modifications may be made in carrying out the present invention without departing from the spirit and scope thereof. Insofar as these changes and modifications are within the purview of the annexed claims, they are to be considered as part of my invention.

I claim:

1. The process for preparing a 1-glycosidobenzimidazole which comprises reacting an N-glycosido-orthophenylenediamine with carbon disulfide and barium hydroxide, recovering the corresponding 1-glycosido-2-mercaptobenzimidazole from the resulting reaction product, and reacting said glycosido mercaptobenzimidazole with Raney nickel.

2. The process for preparing a 1-glycoscido-benzimidazole which comprises reacting an N-glycosido-orthophenylenediamine with carbon disulfide and barium hydroxide, recovering the corresponding 1-glycosido-2-mercaptobenzimidazole from the resulting reaction product, reacting said glycosido mercaptobenzimidazole with Raney nickel and recovering said gylcosidobenzimidazole.

3. The process for preparing a 1-glycosido-5,6-dimethylbenzimidazole which comprises reacting a 2-amino-4,5-dimethylglycosidoaniline with carbon disulfide and barium hydroxide, recovering the corresponding 1-glycosido-2-mercapto-5,6-dimethylbenzimidazole from the resulting reaction product, and reacting said glycosido mercaptobenzimidazole with Raney nickel.

4. The process for preparing a 1-glycosido-5,6-dimethylbenzimidazole which comprises reacting a 2-amino-4,5-dimethylglycosidoaniline with carbon disulfide and barium hydroxide, recovering the corresponding 1-glycosido-2-mercapto-5,6-dimethylbenzimidazole from the resulting reaction product, reacting said glycosido mercaptobenzimidazole with Raney nickel, and recovering said glycosido-5,6-dimethylbenzimidazole from the reaction mixture.

5. The process for preparing 1-glycosido-2-mercapto-benzimidazoles which comprises reacting an n-glycosido-orthophenylenediamine with carbon disulfide and barium hydroxide.

6. The process for preparing 1-glycosido-2-mercapto-5,6-dimethylbenzimidazole which comprises reacting 2-amino-4,5-dimethylglycosidoaniline with carbon disulfide and barium hydroxide.

7. The process for preparing 1-α-ribofuranosido-5,6-dimethylbenzimidazole which comprises reacting carbon disulfide and barium hydroxide with a compound selected from the group which consists of 2-amino-4,5-dimethyl-5'-trityl-D-ribofuranosidoaniline and 2',3'-diacyl derivatives thereof, recovering the resulting 1-D-ribofuranosido-2-mercapto-5,6-dimethylbenzimidazole compound from said reaction product, treating said 1-D-ribofuranosido-2-mercapto-5,6-dimethylbenzimidazole compound with Raney nickel to convert the 2-mercapto-substituent to hydrogen, and subjecting the 1-D-ribofuranosido-5,6-dimethylbenzimidazole compound thus formed to acid hydrolysis.

8. The process for preparing 1-α-ribofuranosido-5,6-dimethylbenzimidazole which comprises reacting 2-amino-4,5-dimethyl-2',3'-diacetyl-5'-trityl-D-ribofuranosidoaniline with carbon disulfide and barium hydroxide, recovering the corresponding 2',3'-diacetyl-5'-trityl-1-D-ribofuranosido-2-sulfhydryl-5,6-dimethyl-benzimidazole from the reaction product, treating said product with Raney nickel to obtain the corresponding 2',3'-diacetyl-5'-trityl-1-D-ribofuranosido-5,6-dimethylbenzimidazole, and subjecting said benzimidazole to acid hydrolysis.

9. The process for preparing 1-α-ribofuranosido-5,6-dimethylbenzimidazole which comprises reacting 2-amino-4,5-dimethyl-2',3'-diacetyl-5'-trityl-D-ribofuranosidoaniline with carbon disulfide and barium hydroxide, recovering the corresponding 2',3'-diacetyl-5'-trityl-1-D-ribofuranosido-2-sulfhydryl-5,6-dimethylbenzimidazole, treating said product with Raney nickel to obtain the corresponding 2',3'-diacetyl-5'-trityl-1-D-ribofuranosido-5,6-dimethylbenzimidazole, hydrolyzing said benzimidazole by heating with hydrochloric acid in an aqueous-alcohol medium, and recovering 1-α-ribofuranosido-5,6-dimethylbenzimidazole as the picric acid salt from said hydrolysis solution.

10. The process of preparing 1-L-arabinosido-5,6-dimethylbenzimidazole which comprises reacting carbon disulfide and barium hydroxide with 2-amino-4,5-dimethyl-L-arabinopyranosidoaniline, recovering the 1-L-arabinopyranosido-2-sulphydryl-5,6-dimethyl-benzimidazole from the reaction product, and treating said product with Raney nickel to obtain 1-L-arabinosido-5,6-dimethylbenzimidazole.

11. The process for preparing 1-L-arabinosido-5,6-dimethylbenzimidazole which comprises reacting 2-amino-4,5-dimethyl-2',3',4'-triacyl-L-arabinopyranosidoaniline with carbon disulfide and barium hydroxide, recovering 2',3',4'-triacyl-1-L-arabinopyranosido-2-sulphydryl-5,6-dimethylbenzimidazole from the reaction product, treating said product with Raney nickel to obtain 2',3',4'-triacyl-1-L-arabinosido-5,6-dimethylbenzimidazole, and subjecting said product to acid hydrolysis.

12. The process for preparing 1-L-arabinosido-5,6-dimethylbenzimidazole which comprises reacting 2-amino-4,5-dimethyl-2',3',4'-triacetyl-L-arabinopyranosidoaniline with carbon disulfide and barium hydroxide, recovering 2',3',4'-triacetyl-1-L-arabinopyranosido-2-sulphydryl-5,6-dimethylbenzimidazole from the reaction product, treating said product with Raney nickel to obtain 2',3',4'-triacetyl-1-L-arabinosido-5,6-dimethylbenzimidazole, and subjecting said product to acid hydrolysis.

13. 2',3'-diacetyl-5'-trityl-1-D-ribofuranosido-2-sulphydryl-5,6-dimethylbenzimidazole.

14. 2',3',4'-triacetyl-1-L-arabinopyranosido-2-sulphydryl-5,6-dimethylbenzimidazole.

DOROTHEA HEYL HOFFMAN.

REFERENCES CITED

The following references are of record in the file of this patent:

Pigman: Carbohydrate Chemistry, 1948, pages 378 to 381.

Karrer: Helv. Chim. Acta 18 (1935), pp. 70, 75, 77, 1438, 1439, 5 pages.

Honeyman: J. C. S., 1950, pages 967–971.

Beilstein, 4th ed., v. 24, page 119.